Nov. 7, 1933.    G. ENGLE    1,934,345
MAGNET
Filed June 12, 1931
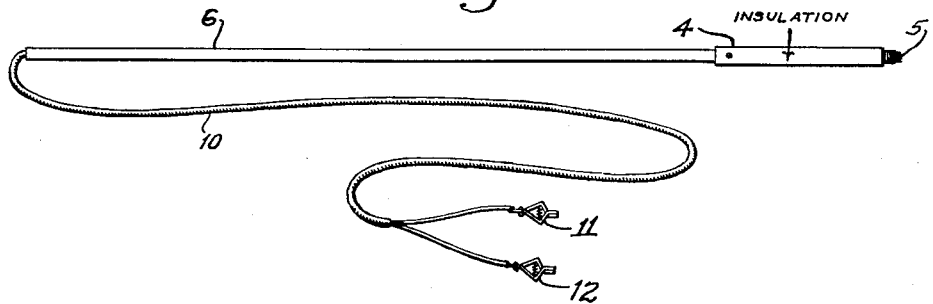
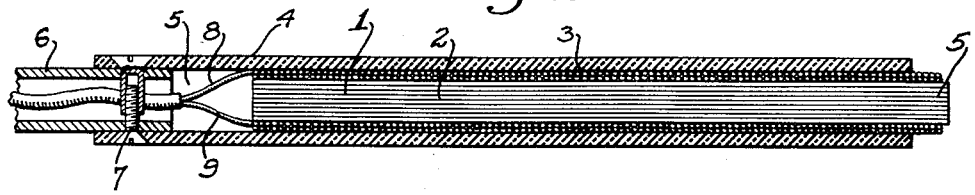
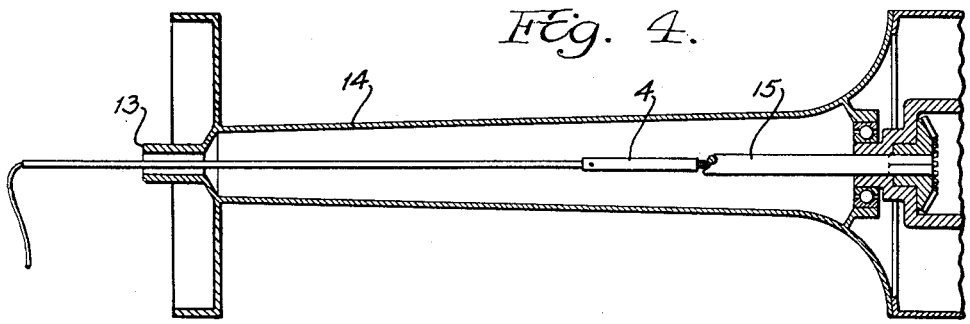
Inventor
George Engle
By Mason Fenwick Lawrence
Attorney Patented Nov. 7, 1933

1,934,345

UNITED STATES PATENT OFFICE 1,934,345

MAGNET

George Engle, Baltimore, Md.

Application June 12, 1931. Serial No. 544,007

1 Claim. (Cl. 175—367)

This invention relates to special tools and particularly to a magnetic tool for drawing the inner parts of broken full floating axles out from the axle housings.

One of the objects of the invention is to provide a rigid tool having a magnetic end, adapted to be inserted in the end of the axle housing in which the broken axle part is lodged, and to be magnetically coupled to said part so that the latter can be withdrawn with the tool.

Another object of the invention is to provide a tool of the character described having an electro-magnet at one end and a hollow rigid handle through which the leads to the magnet extend, and including a sheath of rigid insulation material into which the magnet is fitted at one end, and the handle at the other, the sleeve serving both as a rigid coupling for the handle and magnet as well as a shield to keep the magnet away from the inner walls of the axle housing into which it is introduced, so that the magnet will not stick magnetically to the housing before it has been brought into contact with the broken axle part.

Other objects of the invention will appear as the following description of a preferred and practical embodiment thereof proceeds.

In the drawing in the several views of which the same characters of reference have been employed to designate identical parts:

Figure 1 is a side elevation of the tool, complete;

Figure 2 is a longitudinal diametrical section through the magnet end of the tool;

Figure 3 is a cross section taken along the line 3—3 of Figure 2; and

Figure 4 is a longitudinal section through a part of an axle housing showing the application of the tool to the broken axle part.

Referring now in detail to the several figures, the numeral 1 represents in general an electromagnet comprising a core or bundle 2 of soft iron wires surrounded by the windings 3 of insulated wire. There is of course nothing unusual in the construction of this electro-magnet. The magnet is forced or otherwise rigidly secured within a rigid sheath or shield 4 of insulating material from one end of which the magnet extends for a short distance as is indicated at 5 in Figure 2. The insulation sheath projects beyond the opposite end of the magnet forming a socket 5. A rigid tube or pipe 6 extends into this socket as shown and is secured thereto by any suitable means such for instance as the male and female screw connections shown at 7 in Figure 2. The leads 8 and 9 from the magnet windings pass through the tube or pipe 6, the latter acting as a conduit. Said leads are extended beyond the tube for a suitable distance as a flexible cord 10, the extension of which may be provided with spring clips 11 and 12 for connecting them to the terminals of a storage battery.

In operation, the proper electrical connections having been made, the tool is introduced into the hub end 13 of the axle housing 14, which is somewhat diagrammatically shown in Figure 4. The end of the magnet is brought into contact with the broken axle part 15, being magnetically coupled thereto so that the broken axle part can be readily drawn out.

The insulation sheath or shield 3 acts not only as a rigid connection between the magnet and the tube or pipe 6 which serves as a handle for the tool, but it also functions as a buffer to keep the magnet from coming into contact with the inside wall of the axle housing while it is being introduced. Thus the magnet is kept from sticking to the wall of the housing if it should inadvertently come in contact with said wall, thus facilitating its engagement with the end of the broken axle.

While I have illustrated what I believe to be a preferred and practical form of the invention, it is to be understood that the specific details of construction as shown are merely by way of example and not to be construed as limiting the scope of the invention.

What I claim is:

Magnetic tool comprising a tubular handle, an electromagnet comprising a core and windings of wire about the surface of said core, the leads from which windings pass through said handle, a rigid tubular sheath of insulation material frictionally fitted on said windings, from one end of which the end of the core projects, the opposite ends of said sheath extending beyond said electromagnet and embracing the adjacent end of said tubular handle, and means for detachably connecting said handle rigidly with said sheath.

GEORGE ENGLE.